(12) United States Patent
Nomura

(10) Patent No.: US 6,198,844 B1
(45) Date of Patent: Mar. 6, 2001

(54) IMAGE PROCESSING APPARATUS

(75) Inventor: Shouichi Nomura, Hino (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/237,967

(22) Filed: Jan. 27, 1999

(30) Foreign Application Priority Data

Jan. 28, 1998 (JP) .................................................. 10-015640

(51) Int. Cl.$^7$ ...................................................... G06K 9/00
(52) U.S. Cl. ............................ 382/168; 382/260; 382/274
(58) Field of Search .................................... 382/168, 169, 382/167, 171, 274, 260; 358/518, 522, 521

(56) References Cited

U.S. PATENT DOCUMENTS 5,596,654 * 1/1997 Tanaka .................................. 382/168
5,748,773 * 5/1998 Tashiro et al. ........................ 382/169
5,805,723 * 9/1998 Fujiwara ............................... 382/172

FOREIGN PATENT DOCUMENTS 9-18704   1/1997 (JP) .
9-182093  7/1997 (JP) .

\* cited by examiner

*Primary Examiner*—Phuoc Tran
(74) *Attorney, Agent, or Firm*—Finnegan, Henderson, Farabow, Garrett & Dunner, L.L.P.

(57) ABSTRACT

A method of processing an image includes steps of: obtaining data concerning the brightness of an original image; dividing the data concerning the brightness into a plurality of groups for each brightness domain on the basis of the histogram of the data concerning the brightness; preparing correction information for correcting the data concerning the brightness for each of the plurality of groups, and executing image processing to the original image on the basis of the correction information.

15 Claims, 15 Drawing Sheets

ORIGINAL IMAGE

CONTENTS OF ORIGINAL IAMGE

HISTOGRAM OF IMAGE

REDUCED IMAGE

IMAGE FOR BRIGHTNESS INFORMATION

TWO-VALUED IMAGE

ORIGINAL MASK

IMAGE PROCESSING APPARATUS

BACKGROUND OF THE INVENTION

This invention relates to an image processing method and image processing apparatus capable of dodging or shutting light method, and in particular, to an image processing method and image processing apparatus capable of electronically making the image processing for dodging for the image data read by an image reading means.

In the case where a film (negative-film or positive-film) photographed in a condition with a large brightness difference is developed and printed on a photographic paper, it sometimes occurs that light portions present a uniformly white appearance losing a light tone (whitened or whitening) or dark portions present a uniformly black appearance losing a detailed tone (blackened or black fill-in).

In order to solve the above-mentioned problems of whitening and black fill-in, a technique called 'dodging' or 'burning-in' is sometimes used. The above-mentioned dodging and burning-in (hereinafter referred to as 'dodging' inclusively in this specification) are the methods for obtaining a print without saturation in the light and dark portions, keeping a good contrast and gradation of each photographic object, by giving long time exposure selectively for the area considered to become uniformly white by using a shielding plate with a hole and giving short time exposure selectively for the area considered to become black fill-in by using a shielding plate, while giving usual exposure for the area of intermediate density. Further, in case of printing from a positive-film, a print without saturation can be obtained by the reversed operation of the above.

Furthermore, in the case where an electronic image processing is used, there are like problems of uniform whitening and black fill-in in the final print too; hence, a method for eliminating the uniform whitening and black fill-in by compressing the dynamic range of the original image (described in Japanese laid open patent H9-182093), a method for eliminating the whitening and fill-in by carrying out the dodging image processing preparing a dodging mask from the original (described in Japanese laid open patent H9-18704), and so forth have been proposed.

In the method described in the Japanese laid open patent H9-182093 to compress the dynamic range, it is produced the problem that the contrast and gradation of each photographic object can not be reproduced because the dynamic range is wholly compressed.

Further, in the method described in the Japanese laid open patent H9-18704 to carry out dodging by preparing a dodging mask, the proper effect of dodging is also not to be obtained like the method described in the Japanese laid open patent H9-182093, because the original is subjected to low-pass filter processing and then a dodging mask having a gradation compressed by a gradation-compressing LUT is applied together with the original image.

Furthermore, in some cases of electronic image processing, soft focusing is practiced. In these cases, in order to obtain a soft focus image with an appearance of blurred light as obtained by using a soft filter at the time of photographing, it is required to superpose a mask image with respect to respective numerical values corresponding to the brightness (energy quantity E) at the time of photographing.

On the other hand, in a general print system, it is favorable that the image data is handled in a unit system wherein the higher brightness domain is compressed such as density and $L^*$, in order to secure a sufficient range of gradation reproduction and the precision of image processing.

For this reason, in order to obtain a favorable soft focus image, an additional processing such as converting density or $L^*$ into E→composing processing→converting E into density or $L^*$; hence, the load for the computer is increased owing to the necessity to keep the precision of processing high and the increase of the amount of calculation process.

Further, as another means for obtaining soft focus effect, a soft focus processing to be made at the time of printing can also be available; it is characterized by obtaining a print of a spread color, and in low key. In this case too, it can not be actualized by merely blending the image data values corresponding to density or $L^*$, but it requires the calculation process such as converting density or $L^*$ into print exposure quantity E'→composing processing→converting E' into density or $L^*$, resulting in a heavy load like the soft focus processing of the type made at the time of photographing.

Furthermore, in order to obtain the soft focus effect, it is necessary to carry out a blurring filter processing of enough size; hence, it gives a large burden to the image processing system, making a high-speed processing difficult.

SUMMARY OF THE INVENTION

Accordingly, it is an object of this invention to actualize an image processing method and an image processing apparatus capable of practicing an image processing for dodging getting rid of the saturation at the light portions and at the dark potions with the contrast and gradation reproduction of each photographic object kept good.

Further, it is another object of this invention to actualize an image processing method and an image processing apparatus capable of practicing a soft focus process suitable for the respective purposes without deteriorating the color tone and without increasing the amount to be processed.

The above-mentioned objects can be accomplished by the image processing method and image processing apparatus shown in the following:

An image processing method comprises the steps of:

obtaining the data concerning the brightness of an original image, dividing said data concerning the brightness into a plurality of groups for the respective brightness domains on the basis of the histogram of said data concerning the brightness, preparing correction information for correcting said data concerning the brightness for each of said plurality of groups, and executing image processing to said original image on the basis of said correction information.

An image processing apparatus comprises:

data obtaining means for obtaining the data concerning the brightness of an original image, dividing means for dividing said data concerning the brightness into a plurality of groups for the respective brightness domains on the basis of the histogram of said data concerning the brightness, correction information preparing means for preparing correction information for correcting said data concerning the brightness for each of said plurality of groups, and image processing means for executing image processing to said original image on the basis of said correction information.

Further, the above-mentioned problems can be solved by any one of the methods and apparatus as favorable embodiments of the invention shown in the following:

(1) An image processing method comprising the steps of:
obtaining the data concerning the brightness out of the original image data,
dividing said data concerning the brightness into a plurality of groups according to the set of said data concerning the brightness,
preparing a mask on the basis of at least one of said plurality of groups, and
executing image processing to image data on the basis of said mask.

An image processing apparatus for carrying out dodging image processing comprising:
means for obtaining the data concerning the brightness out of the original image data,
means for dividing said data concerning the brightness into a plurality of blocks according to the set of the frequencies of emergence of said data concerning the brightness,
means for preparing a dodging mask on the basis of at least one of said plurality of blocks, and
image processing means for carrying out addition calculation with this dodging mask and the corresponding pixels of the original image.

Incidentally, in this specification, 'data concerning the brightness' means, in addition to the brightness, various pieces of information concerning the lightness of the photographic object such as the transmission (reflection) density of the original, the print exposure quantity E, logE, and the transmittance (reflectance) of the original.

Further, in this specification, 'the set' means the peak of the histogram, the set as the positions of the image or the like.

Furthermore, in this specification, 'a mask' means data composed of the data of a pixel group having the same size as the image, being the one for being subjected to various kinds of processes with the data of the corresponding pixels of the original image.

In this invention, the original image data are divided into a plurality of groups or blocks on the basis of the data concerning the brightness of the original image. Then, a dodging mask for adding it to the image data of at least one of these plural blocks or groups, a correction value different to those added to the other blocks or groups, is prepared. Further, regarding the dividing of the data into a plurality of blocks or groups, a dividing process is carried out in accordance with the frequencies of emergence or with the manner of the arrangements at the respective image positions of the data concerning the brightness of the original image. Furthermore, image processing such as adding calculation is carried out for the respective pixels of this mask and those of the original image corresponding to them; hence, it is actualized the image processing for dodging to get rid of saturation at the light portions and dark portions, with the contrast and gradation reproduction of each of the photographic objects kept good.

Further, in the above-mentioned image processing method, it is favorable that the image processing is such a processing as to add the data of the original image to the data of the mask for each of the corresponding pixels. Moreover, it is also favorable that the data is divided into a plurality of groups on the basis of the histogram of the data concerning the brightness; it is also favorable that the data is divided into a plurality of groups on the basis of the shape of the histogram. Furthermore, it is also favorable that the mask is the one for dodging for adding it to the data of at least one of the plural groups a correction value different to those added to the other groups.

(2) An image processing method set forth in the paragraph (1), wherein at the time of obtaining the aforesaid data concerning the brightness, the data are obtained out of the thinned data of the original image, the dodging mask prepared according to the set of frequencies of emergence of these data concerning the brightness is enlarged to the same size as the original image after it is blurred by a blurring filter, and the adding operation is carried out with the pixels of this dodging mask and those of the original image corresponding to them.

An image processing apparatus set forth in the paragraph (1), wherein the data concerning the brightness are obtained out of the thinned data of the original image, and the aforesaid image processing means enlarges the dodging mask prepared according to the set of frequencies of emergence of these data concerning the brightness to the same size as the original image after it is blurred by a blurring filter, and carries out the adding operation with the pixels of this dodging mask and those of the original image corresponding to them.

In this invention, at the time of obtaining the data concerning the brightness, they are obtained out of the thinned data of the original image produced by pre-scanning etc., hence, processing in a short time becomes possible for using a general CPU and a general processing language, because only a small amount of calculation is required in the calculation process.

(3) An image processing method set forth in the paragraph (2), wherein the process blurring the dodging mask by a blurring filter is carried a plurality of times.

An image processing apparatus set forth in the paragraph (2), wherein the aforesaid image processing means carries out the process blurring the dodging mask by a blurring filter a plurality of times.

In this invention, the process blurring the dodging mask is carried out a plurality of times to prepare it, hence, a dodging mask having a smooth shape can be prepared and a natural dodging can be actualized.

(4) An image processing method set forth in any one of the paragraphs (1)–(3), wherein the aforesaid original image is a color image, and the data concerning the brightness included in the color image are obtained to prepare the dodging mask, which is added to the plural color components of the original image.

An image processing apparatus set forth in any one of the paragraphs (1)–(3), wherein the aforesaid original image to be read is a color image, and the aforesaid image processing means obtains the data concerning the brightness included in the color image to prepare the dodging mask, which is added to the plural color components of the original image.

In this invention, the data concerning the brightness (monochromatic data) are obtained to prepare the dodging mask. Further, dodging is actualized by adding this dodging mask (the same mask for the respective color components) to the respective plural color components of the original image.

As a result of this, also for a color image, the image processing for dodging to get rid of saturation at the light and dark portions can be actualized, with the contrast and gradation reproduction of each of the photographic objects kept good.

(5) An image processing method set forth in any one of the paragraphs (1)–(3), wherein the aforesaid original image is a negative color image, and the data concerning the brightness are obtained from a plurality of color components included in the density values of the negative color image to prepare the dodging mask, which is added to the respective color components of the original image.

An image processing apparatus set forth in any one of the paragraphs (1)–(3), wherein the original image to be read is a negative color image, and the aforesaid image processing means obtains the data concerning the brightness from a plurality of color components included in the density values of the negative color image to prepare the dodging mask, and adds this dodging mask to the plural components of the original image.

In this invention, the density values of the respective color components of a negative color image are read, and the data concerning the brightness (monochromatic data) are obtained from the average values of these density values of the respective color components to prepare the dodging mask. Further, dodging is actualized by adding this dodging mask (the same mask for the respective color components) to the respective plural color components of the original image.

As a result of this, also for a negative color image, the image processing for dodging to get rid of saturation at the light and dark portions can be actualized, with the contrast and gradation reproduction of each of the photographic objects kept good.

(6) An image processing method set forth in any one of the paragraphs (1)–(5), wherein a plurality of different correction values are obtained from the aforesaid plural blocks, the dodging mask is prepared from these correction values, and an adding operation is carried out with this dodging mask and the corresponding pixels of the original image.

An image processing apparatus set forth in any one of the paragraphs (1)–(5), wherein the aforesaid image processing means obtains a plurality of different correction values from the aforesaid plural blocks, prepares the dodging mask from this correction values, and carries out an adding operation with this dodging mask and the corresponding pixels of the original image.

In this invention, the dodging mask is prepared according to the data sets in the histogram; hence, it is actualized an image processing for dodging to get rid of saturation in the light and dark portions, with the contrast and gradation reproduction of each of the photographic objects, from the shadow area to the highlight area, kept good.

(7) An image processing method comprising the steps of:
  obtaining the image data for the respective color components included in the image in a condition that the original image is thinned to produce images for the respective colors,
  enlarging said produced images for the respective colors to the same image size as the original image after blurring them by a blurring filter to produce blurred images for the respective colors, and
  carrying out a weighted adding operation with this blurred images for the respective colors and the corresponding pixels of the respective color components of the original image to produce a soft focus image.

An image processing apparatus wherein the aforesaid image processing means obtains the image data for the respective color components included in the image in a condition that the original image is thinned to produce images for the respective colors, enlarges said produced images for the respective colors to the same image size as the original image after blurring them by a blurring filter to produce blurred images for the respective colors, and carries out a weighted adding operation with this blurred images for the respective colors and the corresponding pixels of the respective color components of the original image to produce a soft focus image.

In this invention, color images for the respective color components are blurred, enlarged, and subjected to a weighted adding operation to the original image in a manner such that the total sum of the addition becomes one (1); hence, soft focus processing of the type made at the time of photographing or of the type made at the time of printing can be actualized without deteriorating the color tone in soft focus processing.

Further, because images for the respective colors are produced from the color image in a condition that the original image is thinned, and are blurred, the amount of processing can be reduced.

(8) An image processing method comprising the steps of:
  obtaining the image data for the respective color components included in the image in a condition that the original image is thinned to produce images for the respective colors,
  enlarging said produced images for the respective colors to the same image size as the original image after blurring them by a blurring filter to produce blurred images for the respective colors,
  executing a predetermined calculation process to the remainder of the subtracting calculation of this blurred images for the respective colors by the corresponding pixels of the respective color components of the original image, and
  adding to the result the data values of the corresponding pixels of the respective color components of the original image to produce a soft focus image.

An image processing apparatus for carrying out soft focus processing comprising image processing means for
  obtaining the image data for the respective color components included in the image in a condition that the original image is thinned to produce images for the respective colors,
  enlarging said produced images for the respective colors to the same image size as the original image after blurring them by a blurring filter to produce blurred images for the respective colors,
  executing a predetermined calculation process to the remainder of the subtracting calculation of this blurred images for the respective colors by the corresponding pixels of the respective color components of the original image, and
  adding to the result the data values of the corresponding pixels of the respective color components of the original image to produce a soft focus image.

In this invention, color images for the respective color components are blurred and enlarged, and a predetermined calculation process is executed to the remainder of the subtraction of this blurred images for the respective colors by the corresponding pixels of the respective color components of the original image, and further, the data values of the corresponding pixels of the respective color components of the original image are added to the result; hence, soft focus processing of the type made at the time of photographing or of the type made at the time of printing can be actualized without deteriorating the color tone in soft focus processing.

Further, because images for the respective colors are produced from the color image in a condition that the original image is thinned, and are blurred, the amount of processing can be reduced.

DETAILED DESCRIPTION OF THE PREFERRED EMBODIMENT

<The First Example of the Embodiment>

Figure 1:
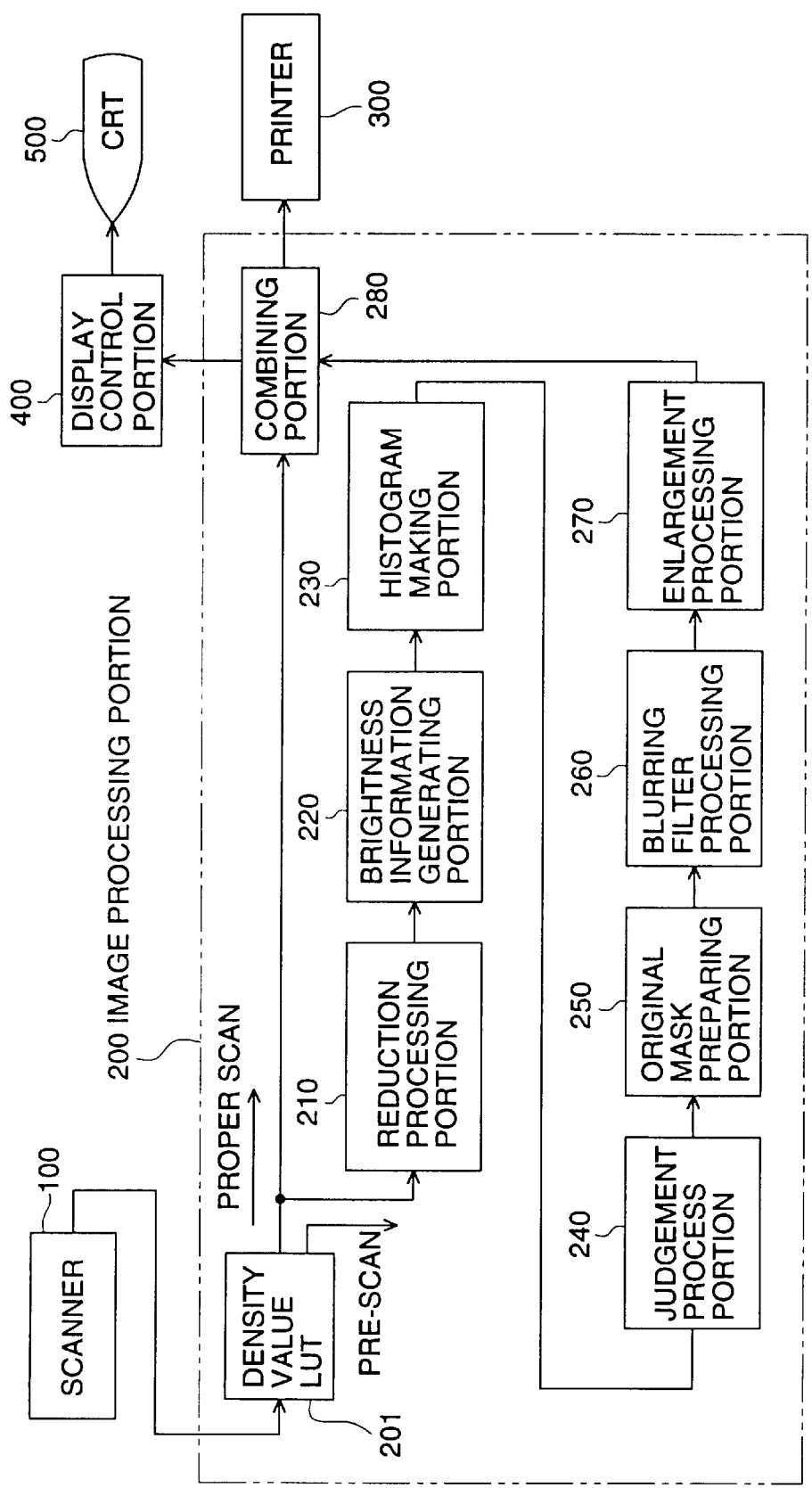
FIG. 1 is a block diagram showing each of the function blocks of the electrical structure of the image processing apparatus used in the first embodiment of this invention.

The image processing apparatus as an apparatus carrying out the image processing method of an example of the embodiment of this invention will be explained with reference to the block diagram in FIG. 1.

100 is the scanner as the image reading means, which reads the desired image from a light transmitting original such as a photographic film or a light reflecting original such as a printed matter and outputs it as digital data.

200 is the image processing apparatus, the main part of this invention, and is provided with all the processing means to be described later.

300 is the printer as the image outputting means, which prints the image processed by the image processing apparatus 200.

400 is the display control portion, which carries out the display control of the image processed in the image processing apparatus 200 (generation of the image to be displayed).

500 is the display means such as a CRT display portion, which displays the image generated in the display control portion 400. Further, in this CRT display portion 500, it is possible to confirm the image to be printed by displaying it beforehand.

In the following, each of the processing means in the image processing apparatus will be explained.

201 is the density value LUT, which is an LUT for converting the digital data from the scanner 100 into the data of negative-density data values.

210 is the reduction processing portion, which is the processing means for reducing the image obtained by the pre-scan to an image having a predetermined size.

220 is the brightness information generating portion, which is the processing means for generating the image having brightness information by making an average of the plural colors R, G, B or Y, M, C or the like.

230 is the histogram making portion, which is the processing means for making a histogram of the brightness values for the data of the image having the brightness information.

240 is the judgment process portion, which divides the sets of the emergence frequencies of these data concerning the brightness into a plurality of blocks at need, by the image judging process to be described later, and determines the correction values in accordance with at least one of these plural blocks.

250 is the original mask preparing portion, which is the processing means for preparing the original mask corresponding to the image, which is the base of the dodging mask, in accordance with the blocks divided by the aforesaid judgment processing.

260 is the blurring filter processing portion, which is the processing means for giving said original mask such amount of blur as to be required in the dodging mask processing by executing the blurring process to said original mask by a blurring filter.

270 is the enlargement processing portion, which is the processing means for producing the dodging mask by enlarging the original blurring mask to the size having the same number of pixels as the properly scanned image. Further, interpolation of pixels is also done at the time of enlargement processing. As for this interpolation technique, various kinds of the methods, for example, bilinear (linear interpolation) method, cubic convolution method, etc. are known, but any other method may be appropriate if it is the one capable of smooth interpolation processing.

280 is the combining portion, which is the processing means for combining the respective corresponding pixels of the proper-scan image and the dodging mask by an adding operation.

Figure 2:
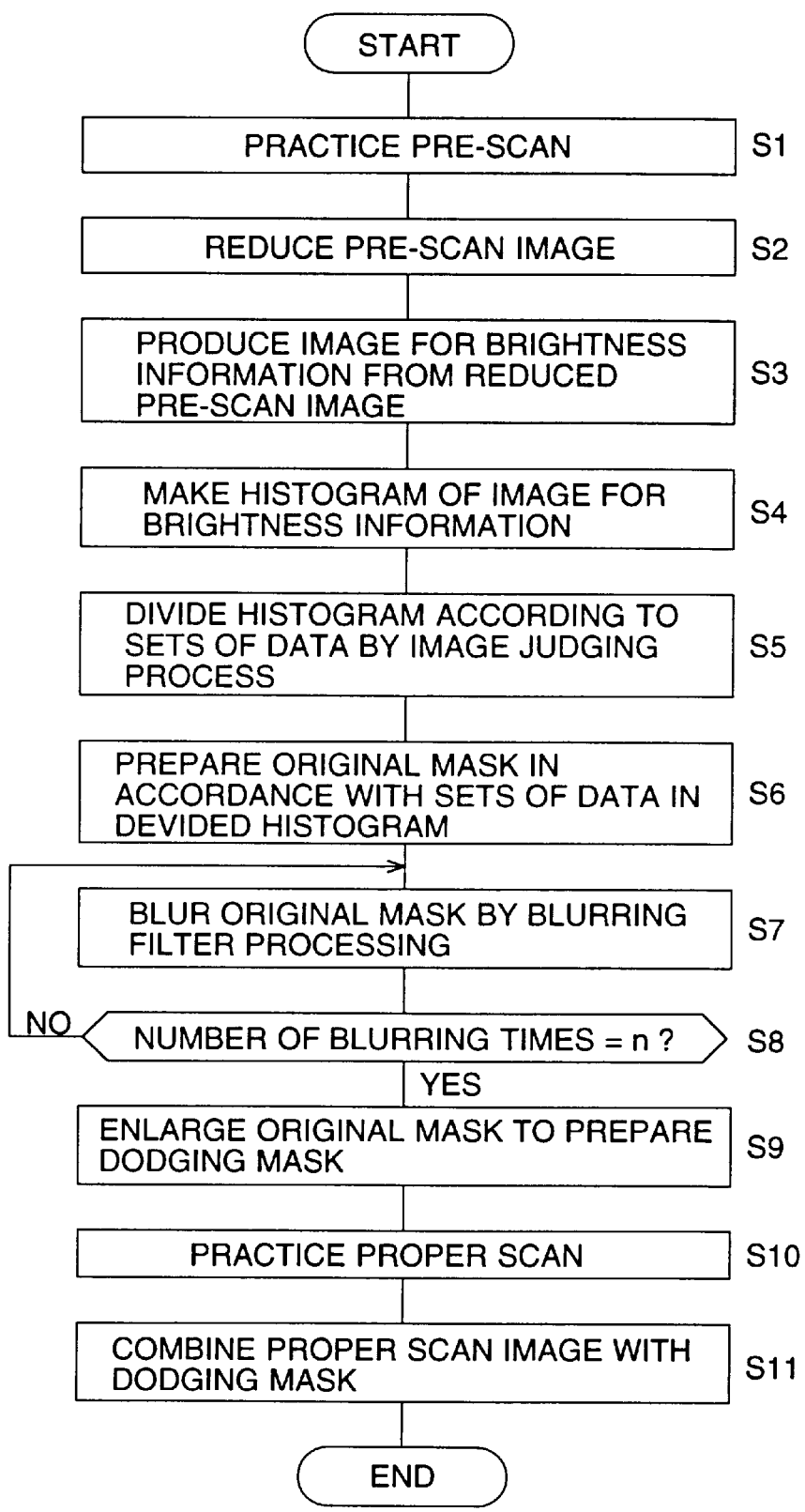
FIG. 2 is a flow chart showing the steps of the procedure of the processing of the image processing apparatus used in the first embodiment of this invention.

Further, FIG. 2 is a flow chart showing the steps of the procedure of the processing of the image data practiced by the image processing apparatus 200. In the following, the explanation will be given in accordance with the steps of the procedure of the processing shown in FIG. 2.

Figure 3:
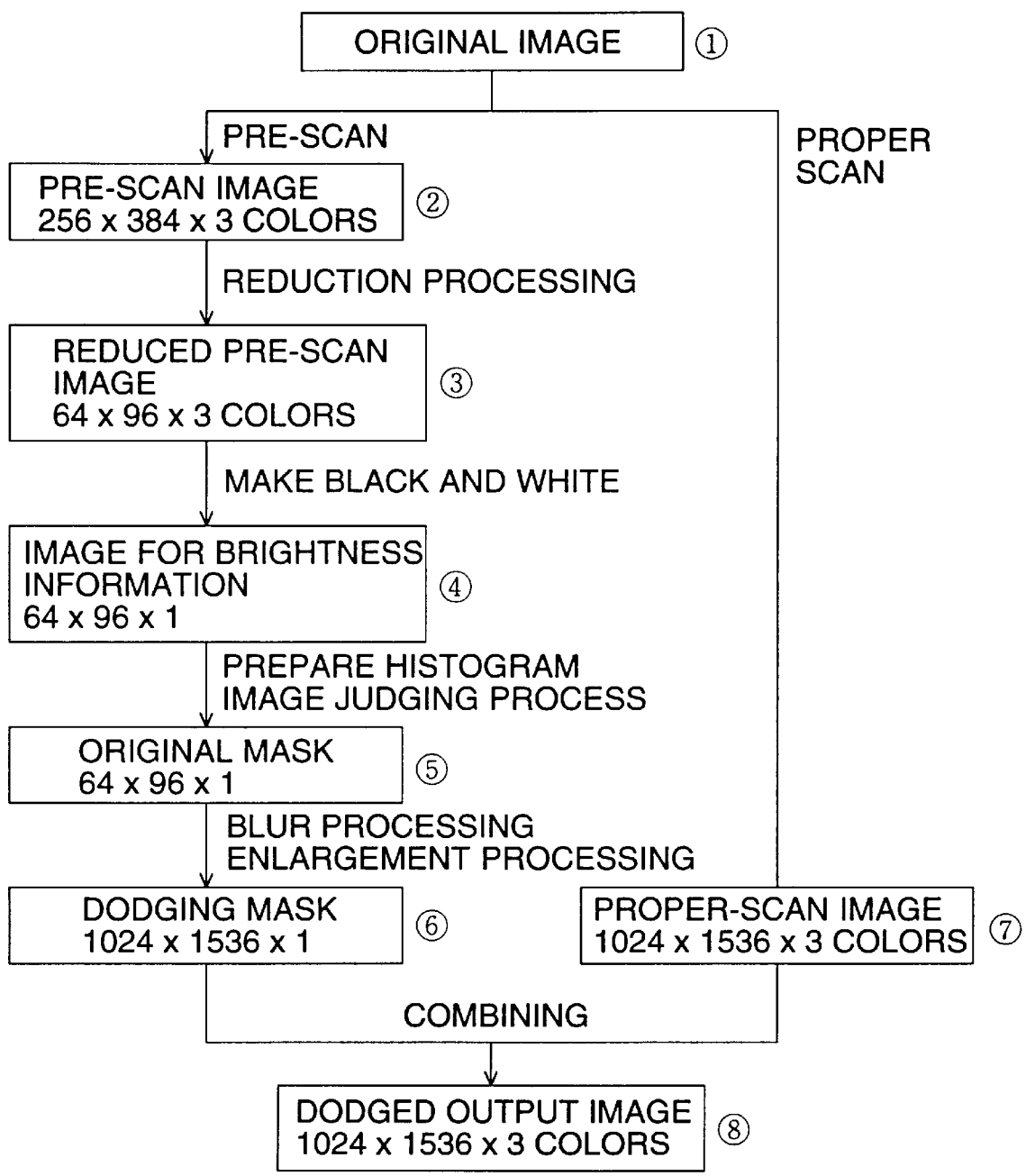
FIG. 3 is a schematic illustration showing the steps of the procedure of the image processing in the first embodiment of this invention.

Furthermore, FIG. 3 is an illustration schematically showing the data produced and prepared with the processing, and FIG. 4 shows an example of an original image and its contents as well as the histogram produced from the original image. Further, figures on and after FIG. 5 are illustrations for explaining the respective processing.

First, a negative-film with an original image recorded on it or the like is set on the scanner 100 to practice a pre-scan (S1 in FIG. 2).

This pre-scan is the process for displaying the image to be printed previously before printing, and further by this display, for judging the necessity of the dodging processing and confirming the result; hence, the number of the pixels to be read may be small.

For instance, in the case where the proper scan has 1024 (vertical)×1536 (horizontal) pixels, the pre-scan should be of 256×384 pixels. Further, this pre-scan gives the data of 256×384 pixels×3 colors by being practiced for the three colors R, G, B simultaneously or sequentially ((2) in FIG. 3).

Further, the data obtained by this pre-scan are converted into the data of negative-density values by the density value LUT 201. Next, these data are reduction-processed by the reduction processing portion 210, and a reduced pre-scan image having a size suitable for the dodging processing ((3) in FIG. 3) is produced (S2 in FIG. 2). This reduced pre-scan image should be of 64×96 pixels×3 colors, or of 128×192 pixels×3 colors. It is favorable to carry out the reduction processing by simply averaging the data of neighboring four to sixteen pixels, because the effect of reduction of noises can be obtained.

After that, the image for the brightness information is produced (S3 in FIG. 2), by making the reduced pre-scan image, which is a color image, a black-and-white image in the brightness information generating portion. In this case, a monochromatic image for the brightness information having 64×96 pixels is obtained ((4) in FIG. 3).

Figure 4A:
FIGS. 4(a) to 4(c) are illustrations schematically showing how the histogram corresponds to an image in the first embodiment of this invention.
Figure 4B:
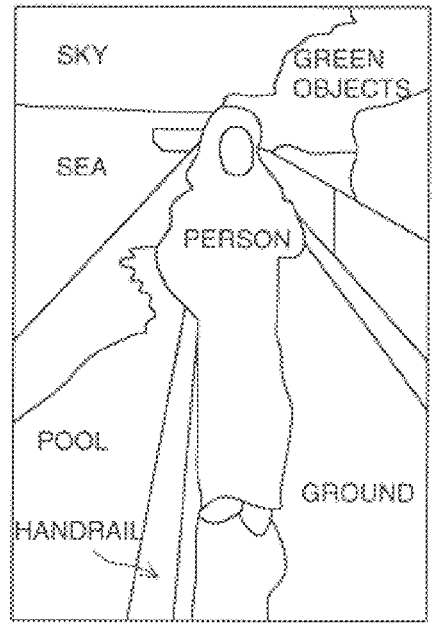

Then, regarding the image for the brightness information, a histogram of the frequencies of emergence vs. brightness is prepared (S4 in FIG. 2), on condition that the original image is such one as is shown in FIG. 4(a) in this case. Further, the contents of the image are shown in FIG. 4(b) because the detailed color tone and gradation can not be shown in FIG. 4(a). In this image, the sky, a sea, green objects, a person, a pool, a handrail, the ground, etc. are included.

Figure 4C:
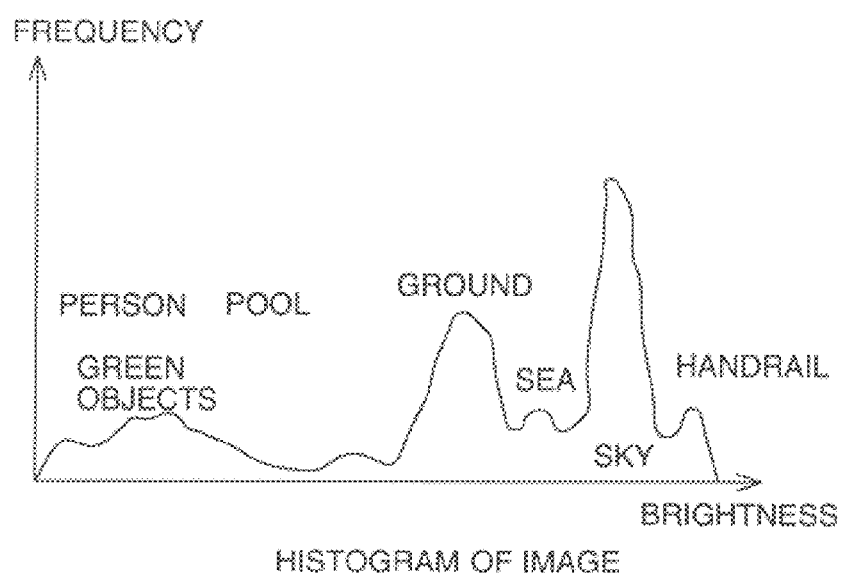
Figure 5A:
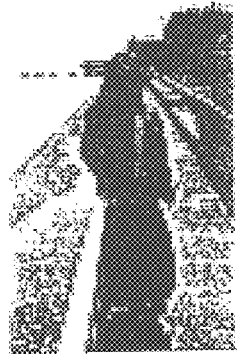
FIGS. 5(a) to 5(d) are illustrations schematically showing how the original mask is prepared.
Figure 5B:
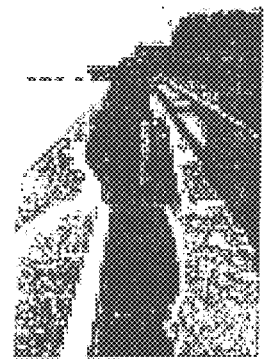

In this case, after the above-mentioned image obtained by the pre-scan is reduction-processed (FIG. 5(a)) and the image for the brightness information is produced (FIG. 5(b), the histogram as shown in FIG. 4(c) is prepared from the image for the brightness information by the histogram making portion 230.

Then, regarding this histogram, the judgment process portion 240 executes the image judging process, and divides the sets of emergence frequencies of the data concerning the brightness into a plurality of blocks (S5 in FIG. 2). In this case, the data are divided into two or more blocks by setting a threshold value using the discrimination criterion method or the like.

Further, with reference to this histogram, if the maximum density and the minimum density are included in the predetermined range M, the dodging process is judged to be not necessary, and if they are out of the above-mentioned range M, the processing is continued; however, in the case where the image is displayed on the CRT display portion 500 and the operator instructs the dodging processing, a definite amount of dodging processing may be done regardless of the value of M.

Furthermore, regarding the method for dividing the original image into a plurality of blocks or groups (hereinafter referred to simply as a plurality of blocks) on the basis of the data concerning the brightness of the original image, in this example of the embodiment, the dividing process is done by obtaining a threshold value of the data concerning the brightness through applying the discrimination criterion method to the histogram; however in addition to this, as the method for obtaining the threshold value, the one such that the threshold value is obtained from the shape of the peaks and dips of the histogram or from the shape and the inflection point of the accumulated density function is to be cited.

Further, it may be appropriate to use the following methods: the method dividing the original image into a plurality of blocks by using the techniques such as the edge detection in the image field, the domain detection, and the pattern matching; and the one first dividing the original image roughly into a plurality of blocks by obtaining the threshold values of the brightness from said shape of the histogram or the accumulated density function, and next finely defining the domain borders by using the techniques such as said edge detection in the image field, domain detection, and pattern matching. In this case, it is appropriate to obtain first the data relating to the average values or the representative values of the data concerning the brightness of the image data in the determined domains, and next, from the relations of these data, to obtain the correction values corresponding the respective blocks.

It is shown herein an example in which the image data are divided into two blocks by a single threshold value and the dodging mask having a single correction value is prepared on the basis of one of the blocks; however, it may be appropriate to prepare the dodging mask having a plurality of correction values by dividing the data into more blocks. Further, another example wherein the data are divided into three or more blocks by using two or more threshold values will be explained in detail later.

In the case where the histogram of the brightness is the one as shown in FIG. 6(a), several peaks and the dips between them are detected from the shape of the histogram. Then, in this case, a dip bordering the highlight side to the shadow side is searched to be found, and this dip portion is made a dividing point (FIG. 6(b)). Further, the correction value by the dodging mask should be obtained in the judgment process portion 240, in order that the maximum density and the minimum density may be included in the predetermined range M.

Now, the dodging mask shall be prepared in accordance with at least one of the plural blocks (S6 in FIG. 2).

Figure 5C:
Figure 5D:
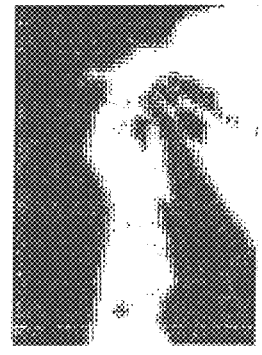

First, the original mask preparing portion 250 produces the image, which is binarized by making the brightness of this dividing point the threshold value, from the image for the brightness information (FIG. 5(c)). Further, the original mask is produced by reversing this binarized image (S6 in FIG. 2, (5) in FIG. 3, FIG. 5(d)). In this case, the data of 64×96 pixels×1 (color), the same as the image for the brightness, can be obtained.

Next, the blurring filter processing portion 260 executes the blurring filter processing of the order 3×3–5×5 to the original mask (S7 in FIG. 2). At this time, the blur processing is to be repeated plural number n times so that the mask may have a suitable amount of blur for dodging (S8 in FIG. 2).

Figure 7:
FIG. 7 is an illustration showing an example of the dodging mask in the first embodiment of this invention.

Then, the enlargement processing portion 270 executes the enlargement processing to the original mask which is given a suitable amount of blur to prepare the dodging mask enlarged to the same size (1024 (vertical)×1536 (horizontal) pixels) as the proper-scan image obtained by the proper scan (S9 in FIG. 2, (6) in FIG. 3). In addition, it is shown in FIG. 7 the mask prepared by blur-processing and enlarging the original mask as described in the above.

Further, by enlarging the original mask to the same size as the proper-scan image after it is blur-processed in the reduced original mask stage as stated in the above, it is made easy to cope with various kinds of proper-scan image sizes. Especially, even in the case where it is required to make the process speed high, it is easy to cope with those various sizes.

After the dodging mask is prepared in the above-mentioned manner, or while the mask is being prepared, the proper scan is carried out to obtain the proper-scan image (S10 in FIG. 2, (7) in FIG. 3). This proper-scan image have the data of 1024 (vertical)×1536 (horizontal) pixels×3 colors.

Then finally, in the combining portion 280, the proper-scan image is combined with the dodging mask (S11 in FIG.

2) to obtain the dodged output image ((8) in FIG. 3). In this case, the same dodging mask is combined with the data for the respective colors of the proper-scan image. In addition, this word 'combining' means doing adding operation with the respective data of the corresponding pixels of the dodging mask and the original image.

Figure 6:
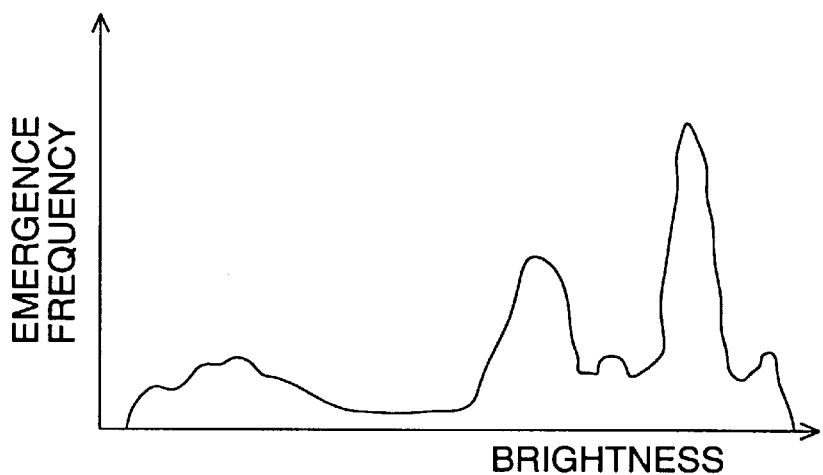
FIGS. 6(a) to 6(c) are illustrations schematically showing how the histogram is divided and corrected in the first embodiment of this invention.
Figure 6:
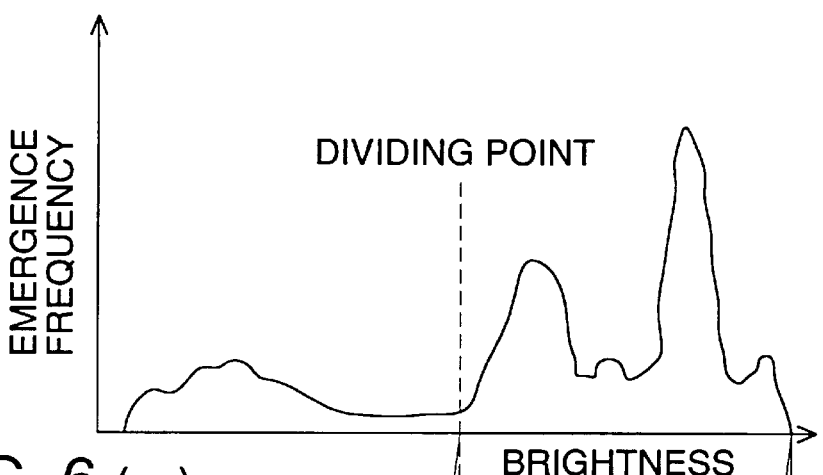
Figure 6:
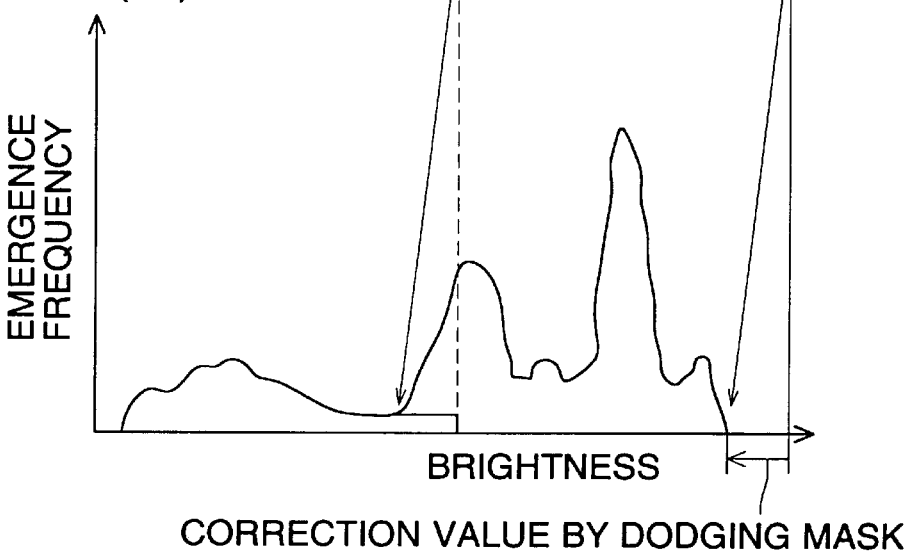

In this case, it is carried out the processing to add the data of the dodging mask with the correction value having been obtained in the aforesaid judgment process portion 240 to the data for the respective colors of the proper-scan image. For instance, in order to suppress the whitening effect in the highlight area, it is suitable to add the dodging mask having a negative correction value. On the other hand, for suppressing the black fill-in in the shadow area, it is suitable to add the dodging mask having a positive correction value. FIG. 6(*c*) shows schematically how the whitening effect in the highlight area is prevented by the addition of the dodging mask with a negative correction value.

As has been explained in detail up to now, in this example of the embodiment, a sufficient consideration is made so that the rough gradation such as the highlight and shadow in the blocks should not be varied to the utmost and it is practiced an image processing such that the brightness is shifted by the dodging mask; hence, it is actualized the dodging image processing to get rid of the saturation in the light area or in the dark area, with the contrast and the gradation reproduction of each of the photographic objects kept good.

<The Second Example of the Embodiment>

Now, as the second example of the embodiment, an example wherein the histogram is divided by a plurality of threshold values will be explained.

In this example of the embodiment, only the image judging process (S5 in FIG. 2) will be explained in detail with reference to the flow chart in FIG. 8. In other words, the explanation for the steps S1 (pre-scan)—S4 (making histogram) and S6 (preparing original mask)—S11 (combining dodging mask with proper-scan image) as shown in FIG. 2 will be omitted because they are approximately the same in both examples of the embodiment.

Figure 8:
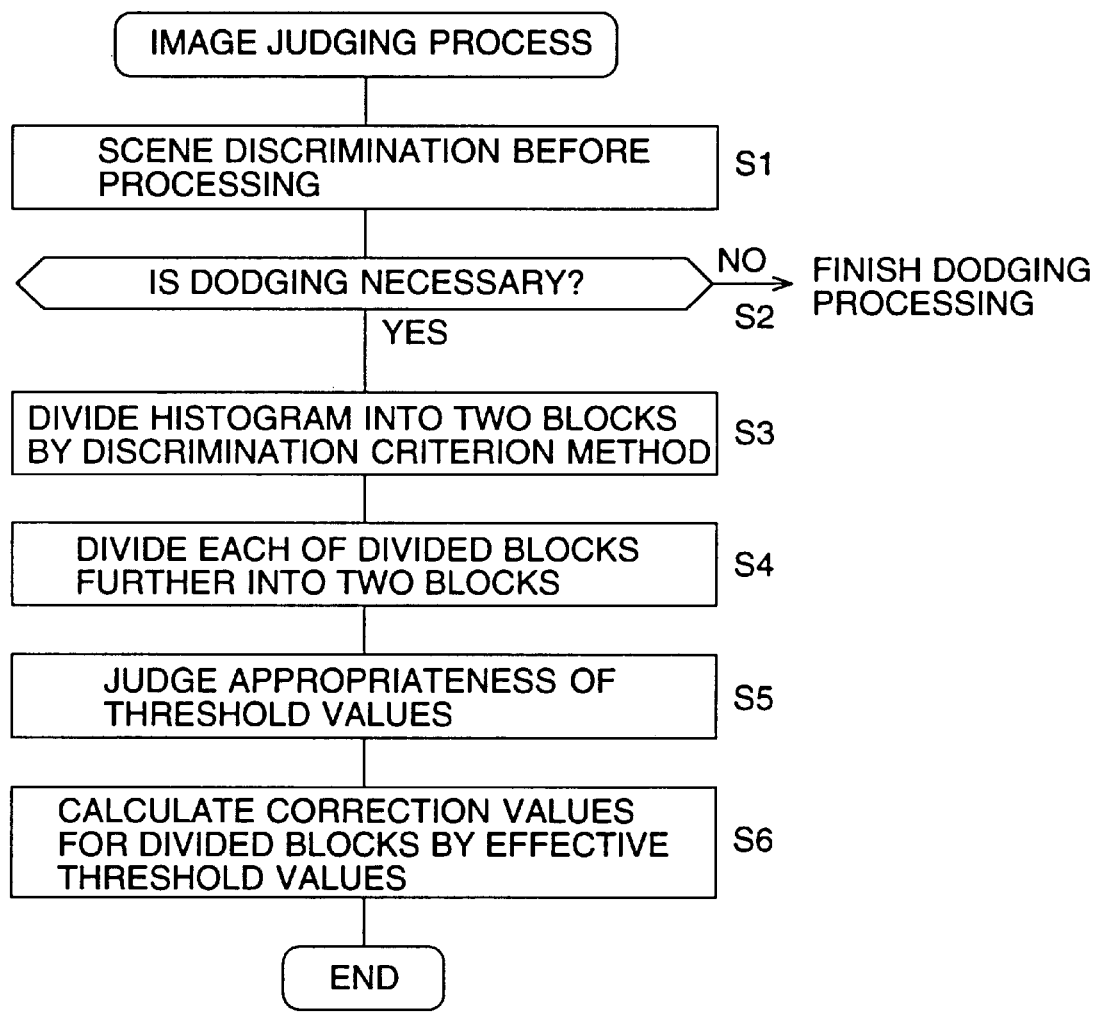
FIG. 8 is a flow chart showing the steps of the procedure of the main part of the processing in the second embodiment of this invention.

First, scene discrimination before processing is carried out with reference to the histogram (S1 in FIG. 8). This scene discrimination before processing is a process judging if the dodging process is necessary or not; that is, by comparing the predetermined density range M with the density range N to be obtained from this histogram, the judgment is done in a manner such that the dodging process is necessary or not according as M<N or M≧N. Further, as for N, it is obtained by defining the maximum density as the point of X% from the top of the histogram, and the minimum density as the point of X% from the bottom of the histogram, where X is determined beforehand as any one of the values 0–5. Hereinafter, the explanation will be continued on condition that M<N and accordingly the dodging process is necessary (S2 in FIG. 8).

Now, using discrimination criterion method, the histogram is divided into two blocks (the block in the highlight side and the block in the shadow side) by the threshold value Th0 (S3 in FIG. 8). In addition, the discrimination criterion method is a technique to determine the threshold value at the time of dividing into two the histogram used in making the image binarized or in other process. That is, at the time of dividing one histogram into two, the method determines the threshold value to make each of the histograms of the divided blocks arranged to be the smallest in a manner such that the covariance of the divided two groups becomes the smallest.

Then, using the discrimination criterion method again, the block in the shadow side is further divided into two blocks by the threshold value Th1. Moreover, the block in the highlight side is further divided into two blocks by the threshold value Th2 (S4 in FIG. 8). Owing to the above, the histogram is divided into four blocks by the three threshold values.

Further, instead of the above-mentioned method of determining the threshold value, the peaks and dips of the histogram are detected after it is smoothed by a suitable filter, and the threshold values may be determined successively from the largest one among the larger ones out of them.

Next, in order to judge if the threshold values having divided the histogram in this manner are appropriate or not, the following characteristic values are calculated (S5 in FIG. 8). Here, the notations are set as follows:

sig*: the standard deviation of the data in each range, av*: the average value of the data in each range, and wt*: the percentage [%] of the pixels present in the vicinity (±2 [negative-density×100], for example) of the threshold value.

Figure 9:
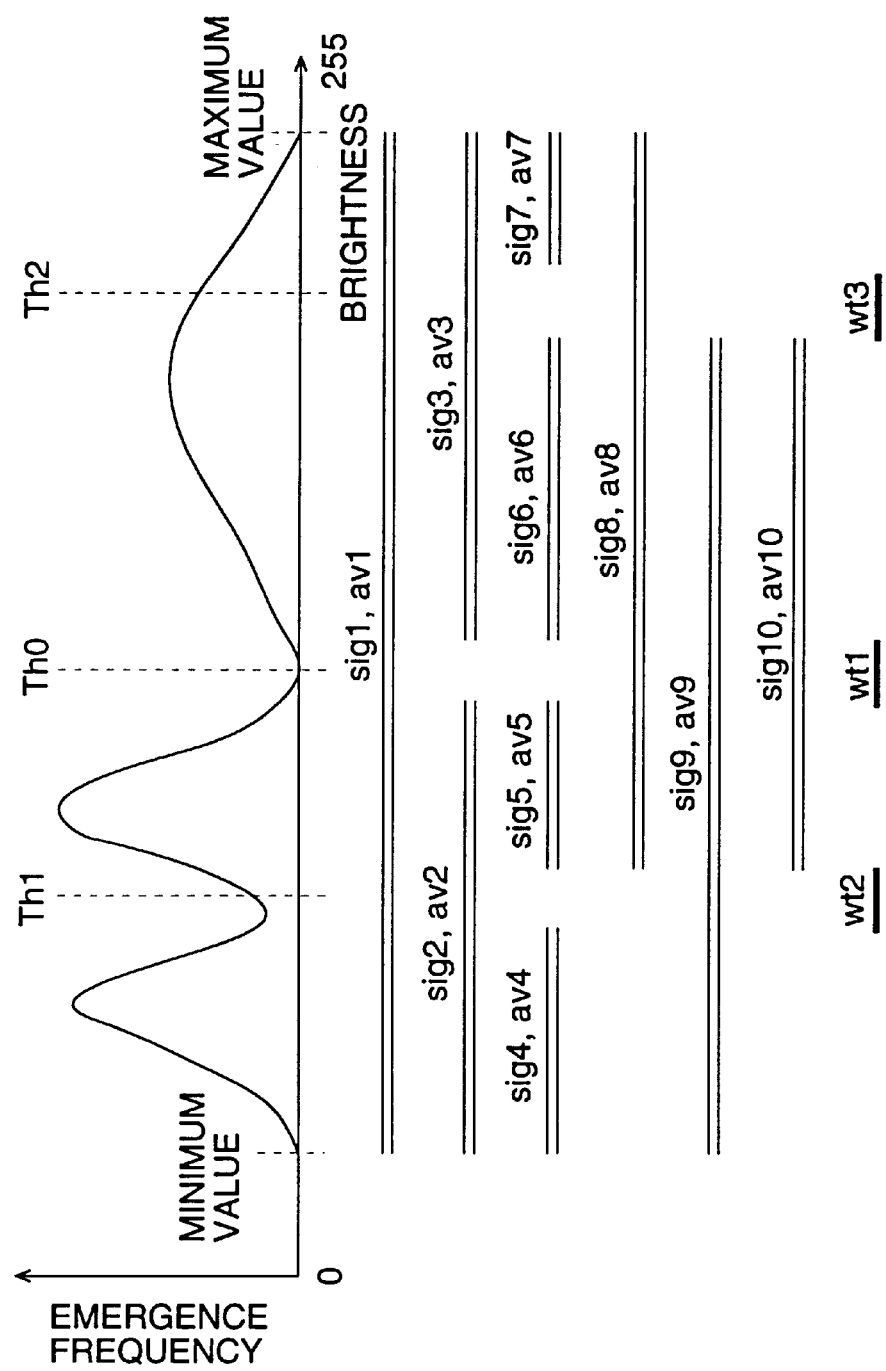
FIG. 9 is an illustration for explaining the processing in the second embodiment of this invention.

That is, in the example shown in FIG. 9, the detailed ones are as follows:

sig1: the standard deviation of the data in the range of the minimum value—the maximum value, sig2: the standard deviation of the data in the range of the minimum value—the threshold value, sig3: the standard deviation of the data in the range of Th0—the maximum value, sig4: the standard deviation of the data in the range of the minimum value—Th1, sig5: the standard deviation of the data in the range of Th1–Th0, sig6: the standard deviation of the data in the range of Th0–Th2, sig7: the standard deviation of the data in the range of Th2—the maximum value, sig8: the standard deviation of the data in the range of Th1—the maximum value, sig9: the standard deviation of the data in the range of the minimum value—Th2, av1: the average value of the data in the range of the minimum value—the maximum value, av2: the average value of the data in the range of the minimum value—Th0, av3: the average value of the data in the range of the Th0—the maximum value, av4: the average value of the data in the range of the minimum value—Th1, av5: the average value of the data in the range of Th1–Th0, av6: the average value of the data in the range of the Th0–Th2, av7: the average value of the data in the range of Th2—the maximum value, av8: the average value of the data in the range of Th1—the maximum value, av9: the average value of the data in the range of the minimum value—th2, wt1: the percentage of the pixels present in the vicinity of the threshold value Th0 [%], wt2: the percentage of the pixels present in the vicinity of the threshold value Th1 [%], wt3: the percentage of the pixels present in the vicinity of the threshold value Th2 [%], Now, it is judged if each of the threshold values are effective or not by the following three discrimination inequalities. Here, let C1, C2, and C3 be the predetermined discrimination constants respectively.

$$(av3 - av2)/(sig2 + sig3) > C1,$$
$$(sig2 + sig3)/sig1 < C2, \text{ and}$$
$$wt1 < C3.$$

If the above three inequalities are established, the threshold value Th0 is effective.

Further, if the following three inequalities are established, the threshold value Th1 is effective.

$$(av5 - av4)/(sig4 + sig5) > C1,$$
$$(sig6 + sig5)/sig2 < C2, \text{ and}$$
$$wt2 < C3.$$

Furthermore, if the following three inequalities are established, the threshold value Th2 is effective.

$$(av7 - av6)/(sig6 + sig7) > C1,$$
$$(sig6 + sig7)/sig3 < C2, \text{ and}$$
$$wt3 < C3.$$

Next, the correction values concerning the blocks divided by the effective threshold values are calculated (S6 in FIG. 8).

Figure 10:
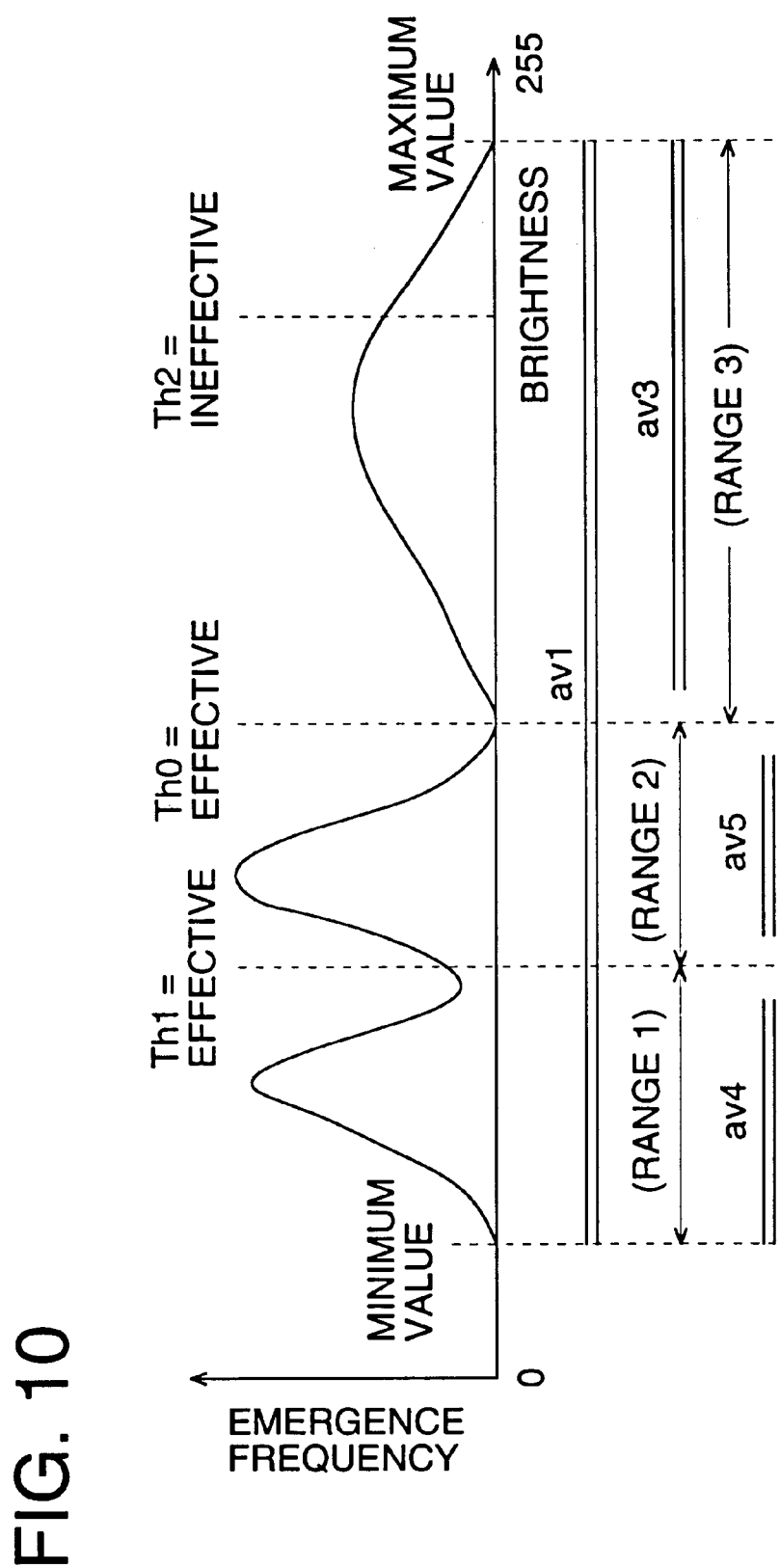
FIG. 10 is an illustration for explaining the processing in the second embodiment of this invention.

Here, the explanation will be given on condition that the Th0 and Th1 are effective, and Th2 is ineffective. For this reason, as shown in FIG. 10, the following processing for calculating the correction values are to be continued, setting that the 'range 1' is from the minimum value to Th1, the 'range 2' is from Th1 to Th0, and the 'range 3 is from Th0 to the maximum value.

That is, it is necessary that the maximum correction value L satisfies the following equation:

$$L=\text{(the maximum value−the minimum value)}-M,$$

in order that the density range to be obtained from the histogram may be included in the predetermined density range M.

In addition, regarding this maximum correction value L, it is possible to set that it has a constant rate (0.1–0.5) for the designated scene.

When this correction value is distributed equally to each of the range 1–range 3, the coefficient of correction K is defined by the following equation:

$$K=1.0-(av3-av4)/\{(av3-av4)+L\}.$$

In this case, the respective correction values J1–J3 for the range 1–the range 3 are given by the following equations:

$$J1=(av1-av4)\times K,$$
$$J2=(av1-av5)\times K,$$

and $$J3=(av1-av3)\times K.$$

Further, by adding the correction values of the respective ranges to the image data belonging to the respective ranges, it is possible to make the range of the brightness to be nearly included in the desired range. In addition, because the correction values are used as the blurred mask, it is possible that, microscopically viewing, some parts that are not included in the range are present; however, no problem will never occur in practical use.

It is desirable that the correction values for the respective ranges J1–J3 are restricted in the following ranges:

|(J1)−(J2)|<(the density range of the range 1),

|(J1)−(J2)|<(the density range of the range 2),

|(J2)−(J3)|<(the density range of the range 2), and

|(J2)−(J3)|<(the density range of the range 3).

By the above-mentioned conditions, in the aforesaid histogram, for example, it can be solved a problem such that the resultant value of the correction for the lowest density belonging to the range 2 is made a smaller value than the resultant value of the correction for the lowest density (minimum density) belonging to the range 1, the darker block to make the image lacking in natural tone as a photograph.

However, regarding the density ranges of the right-hand sides of the above inequalities, in the case where there are deviations in the emergence frequencies of the data in the respective ranges, sometimes no remarkable gradation reversing occurs even though a correction values larger than those defined by the inequalities are used.

Figure 11:
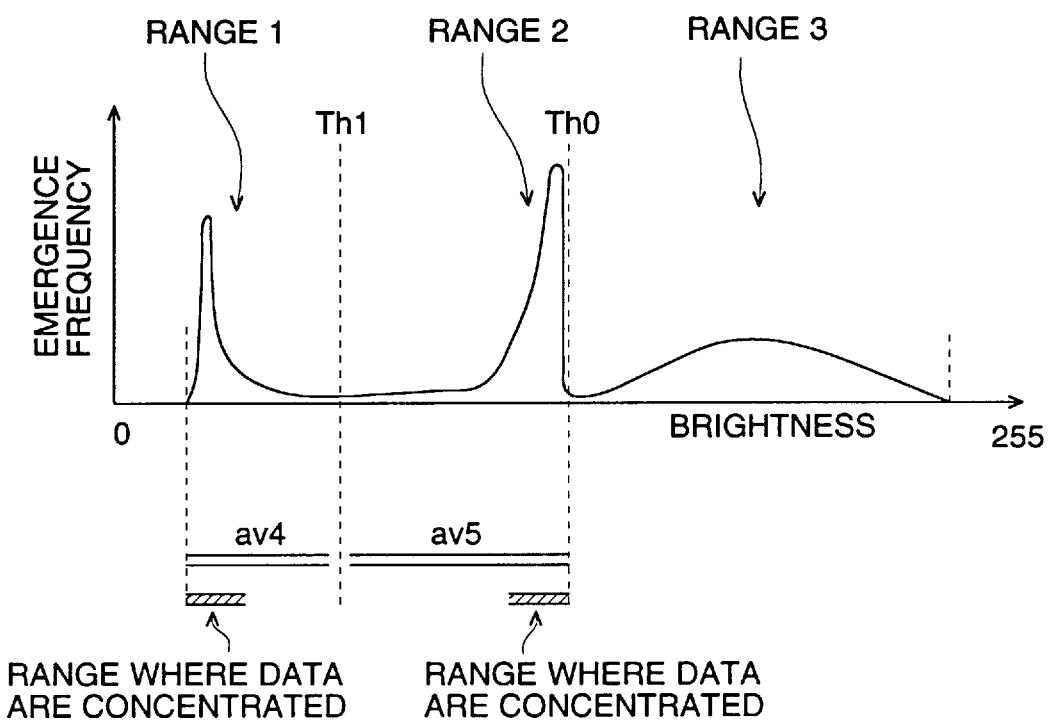
FIGS. 11(a) and (b) are illustrations for explaining the processing in the second embodiment of this invention.
Figure 11:
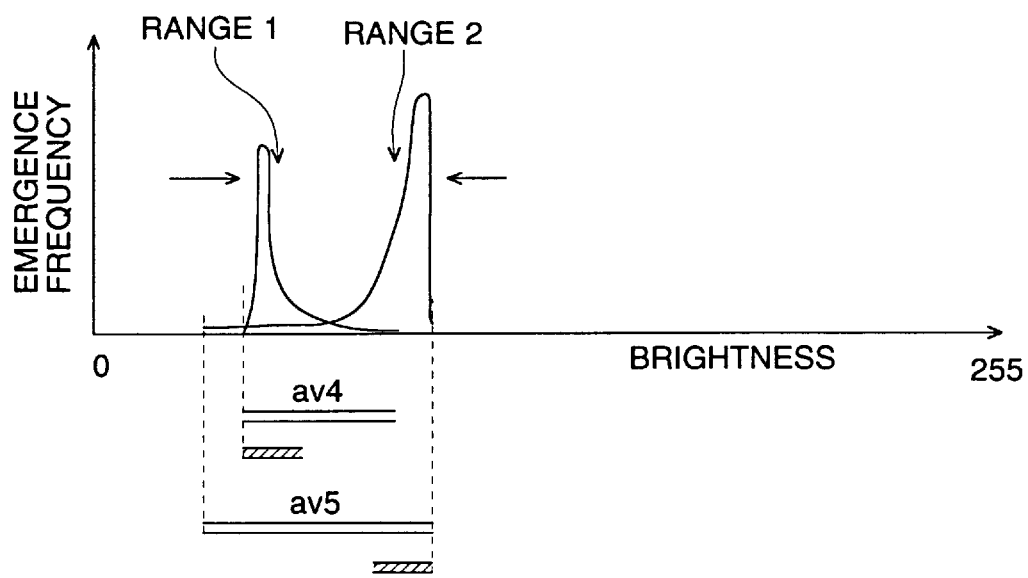

For instance, in the case where the histogram is present in the range 1–range 3 as shown in FIG. 11(*a*), it appears the state where nearly no data are present in the neighborhood of the threshold value Th1. In this case, no problem occurs because it is small the amount of data (number of pixels) which makes the gradation completely reversed, even if the corrections exceeding the ranges of the above inequalities are executed as shown in FIG. 11(*b*). In addition, it is favorable that the amount of data which makes the gradation completely reversed should not be more than 10% of the amount of the data in the range which includes less image data than the other of the relating ranges (the range 1 and the range 2 in this case).

Further, when the following definition are made:

the number of data d1: the number of data, of which the value is made smaller than the minimum value of the data belonging to the range 1 by the correction, among the data belonging to the range 2, and the number of data d2: the number of data, of which the value is made larger than the maximum value of the data belonging to the range 2 by the correction, among the data belonging to the range 1, the number of the data Dr which makes the gradation completely reversed is expressed as follows:

$$Dr=d1+d2.$$

In any one of the cases where the correction values are not within the range defined by the above-mentioned inequalities, the following additional correction value j, which varies in accordance with the image density data value, is defined and can be used by being added to the correction values J of the respective ranges determined to be within the possible ranges, because sufficient corrections can not be made by only the correction values defined by the above-mentioned inequalities.

$$j[x]=\text{(continuous correction coefficient)}\times\{av1-\text{(image density data value)}\},$$

where, $$\text{(continuous correction coefficient)}=1.0-M/(j+M),$$

and $$j = L - (|(J1)| + |(J2)| + |(J3)|).$$

Accordingly, the final correction value C is obtained by the following equation corresponding to each density value x:

C[x]=(additional correction value j[x] corresponding to x)+(the correction value J[class] of the range to which x belongs), where, the class is any one of 1–3.

In the above mentioned manner, it is determined the equation for calculating the correction values at the time of preparing the dodging mask through dividing the histogram, the data of the original mask are converted by the equation for calculating the correction values, and the dodging mask is obtained by this blur processing.

Further, when the correction value C[x] is obtained in the above-mentioned manner, it is desirable that the amount of blur at the time of blurring the original mask should be varied in accordance with the correction value. That is, it is favorable from the view point that more natural result of correction can be obtained, to cope with the variation of the correction value by changing the size of the blurring filter and the number of times of filtering in accordance with the correction value.

In the above, the case where there are two effective threshold values has been shown, but in the case where there is only one effective threshold value, a similar processing is also possible.

Further, according to this method, the correction value is obtained on the basis of the average value of the image information of a whole image field; hence, the dodging process can be actualized without the need to add any modification to the other various kinds of image processing algorithm such as density- and color-correction required in photographic printing. Moreover, because the practical dodging process is a simple one only adding the correction values to the original image, the processing for the scene which does not need the dodging process may be done by merely deleting the adding instruction only, or skipping it; therefore, the method has also an advantage that the selection to use or not to use the function is possible without giving any influence to the other necessary image processing algorithms.

<The Thied Example of the Embodiment>

Now, as the third example of the embodiment, it will be explained the image processing which reproduces soft focusing at the time of photographing in a condition of light spreading without deteriorating the color tone in soft focus processing.

In this example of the embodiment, the soft focus processing will be explained with reference to the block diagram in FIG. 12, the flow chart in FIG. 13, and the illustration in FIG. 14.

Figure 12:
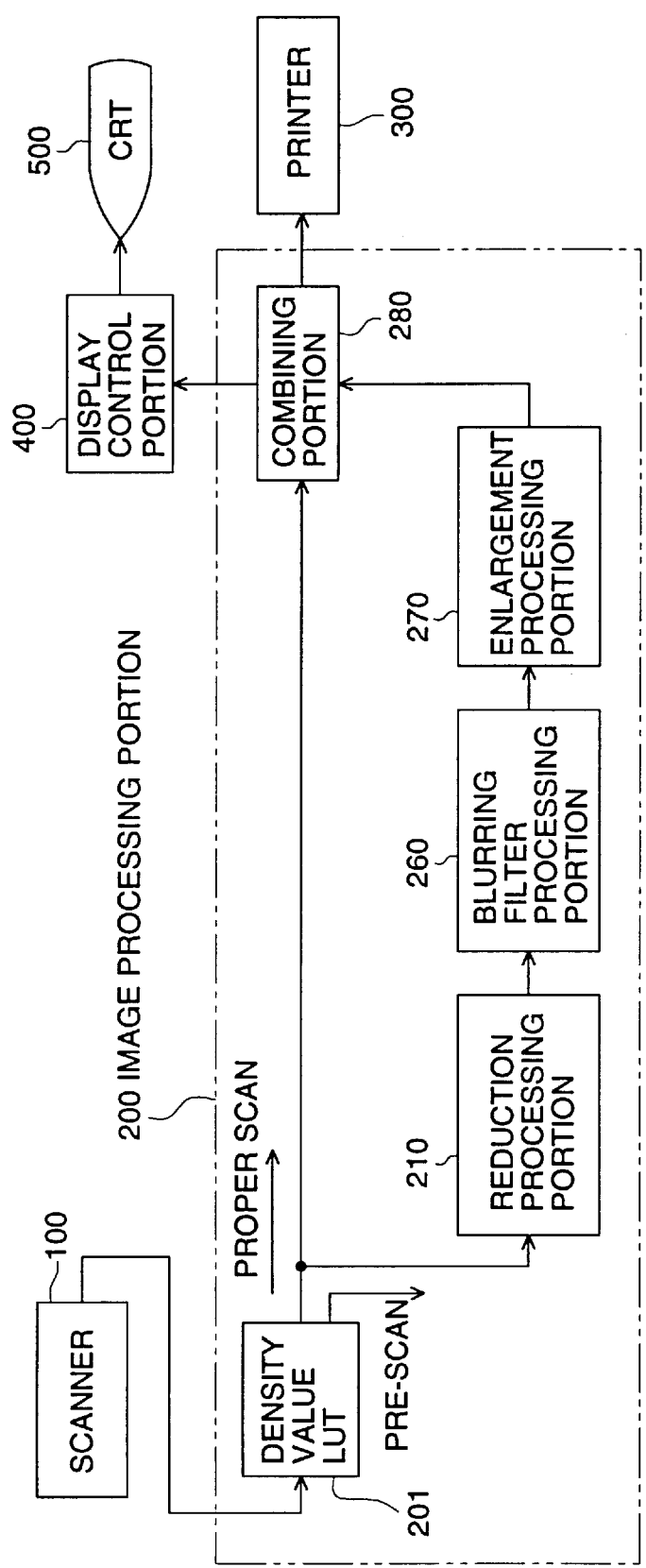
FIG. 12 is a block diagram showing each of the function blocks of the electrical structure of the image processing apparatus used in the third embodiment of this invention.

The block diagram in FIG. 12 is the image processing apparatus 200' provided with the circuit block necessary for the soft focus processing, and to the parts that perform the same function as those explained already in the dodging processing, the same numbers are assigned as them. Accordingly, the repeated explanation will be omitted. In addition, it may be appropriate to use the same image processing apparatus as that shown in FIG. 1 and to make only the necessary functions operate.

Figure 13:
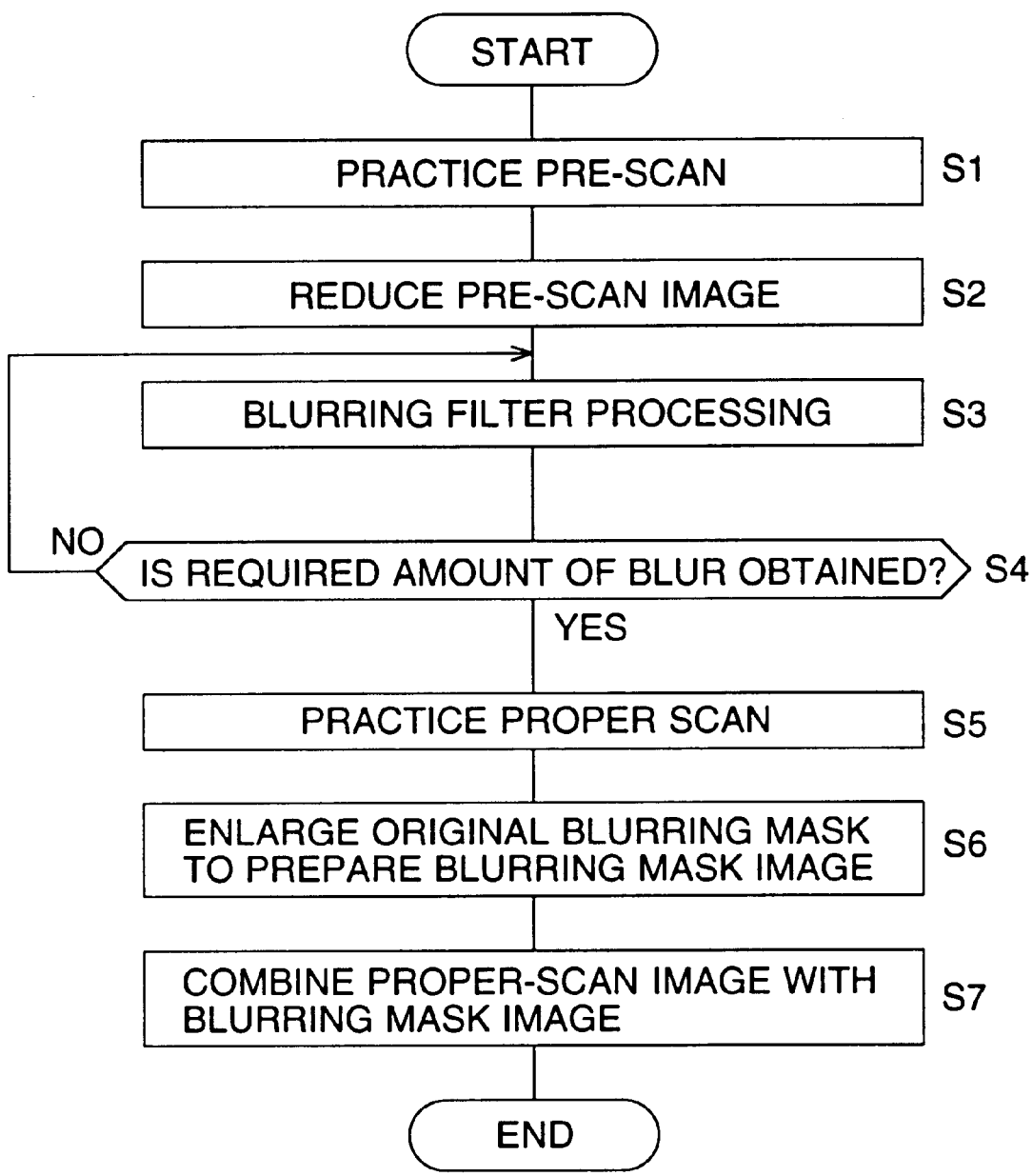
FIG. 13 is a flow chart showing the steps of the procedure of the processing of the image processing apparatus used in the third embodiment of this invention.

First, a negative-film or the like having an original image recorded on it is set on the scanner 100, and the pre-scan process is carried out (S1 in FIG. 13).

This pre-scan is the process for displaying the image to be printed previously before printing, and further, for confirming by this display the result of the soft focus processing; hence, the number of the pixels to be read may be small.

For instance, in the case where the proper scan has 1024 (vertical)×1536 (horizontal) pixels, the pre-scan should be of about 256×384 pixels. Further, this pre-scan gives the data of 256×384 pixels×3 colors by being practiced for the three colors R, G, B simultaneously or sequentially ((2) in FIG. 14).

Further, the data obtained by this pre-scan are converted into the data of negative-density values by the density value LUT 201. Next, these data are reduction-processed by the reduction processing portion 210, and a reduced pre-scan image having a size suitable for the soft focus processing ((3) in FIG. 14) is produced (S2 in FIG. 13). Furthermore, this reduced pre-scan image is used as the original blurring mask image.

This reduced pre-scan image should be of 64×96 pixels×3 colors, or of 128×192 pixels×3 colors. It is favorable to carry out the reduction processing by simply averaging the data of neighboring four to sixteen pixels, because the effect of reduction of noises can be obtained.

Next, the blurring filter processing portion 260 executes the blurring filter processing of the order 3×3–5×5 to the blurred original mask (S3 in FIG. 13). At this time, the blur processing may be repeated plural number n times so that the mask may be the one to have a suitable amount of blur as a blurring mask (S4 in FIG. 13).

Figure 14:
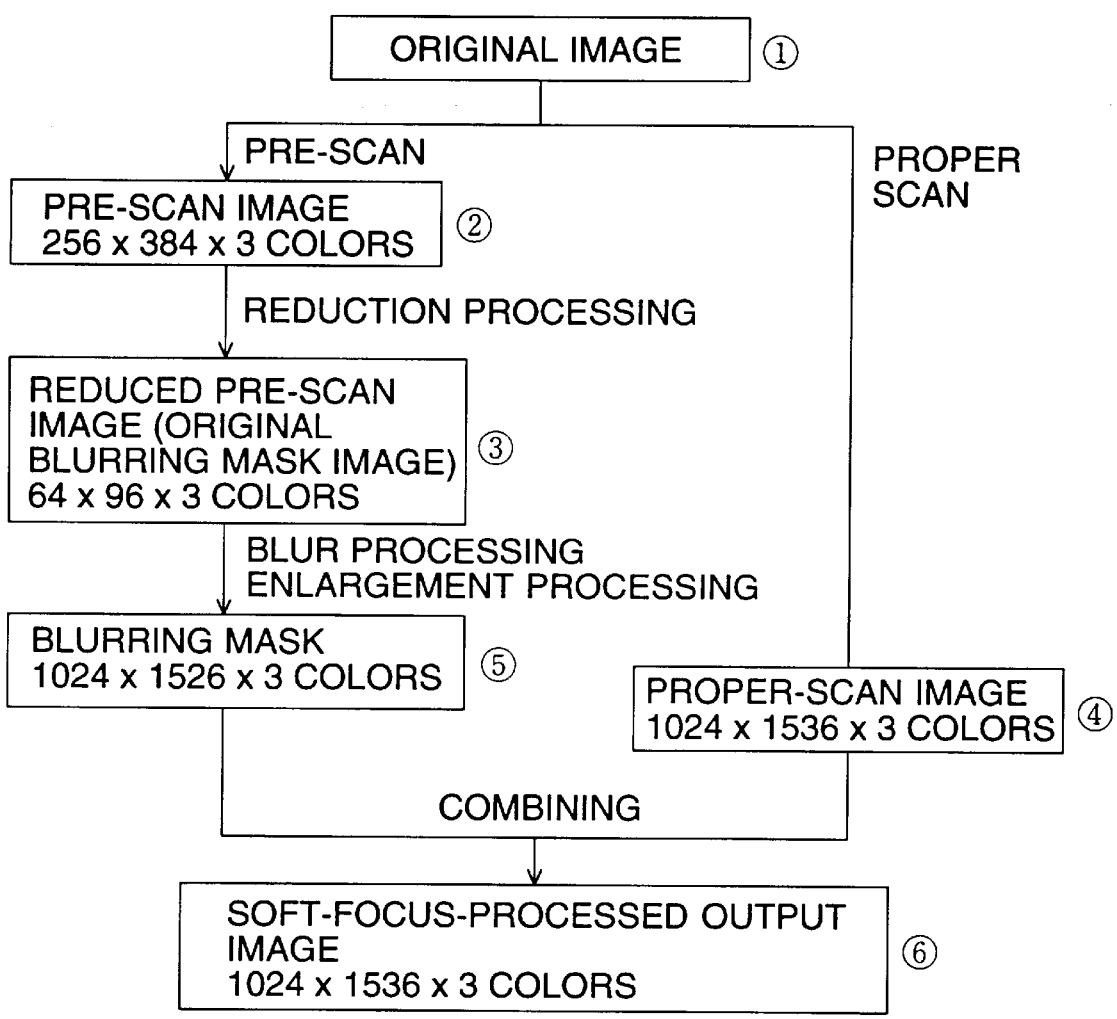
FIG. 14 is a schematic illustration showing the steps of the procedure of the image processing in the third embodiment of this invention.

After the original blurring mask is prepared in the above-mentioned manner, or while the mask is being prepared, the proper scan is carried out to obtain the proper-scan image (S5 in FIG. 13, (4) in FIG. 14). This proper-scan image have the data of 1024 (vertical)×1536 (horizontal) pixels×3 colors.

Then, the enlargement processing portion 270 executes the enlargement processing to the original blurring mask which is given a suitable amount of blur to prepare the blurring mask enlarged to the same size (1024 (vertical)× 1536 (horizontal) pixels) as the proper-scan image obtained by the proper scan (S6 in FIG. 13, (5) in FIG. 14).

Incidentally, by enlarging the original blurring mask to the same size as the proper-scan image after the blur processing is executed to it in the stage of reduced original mask as stated in the above, it is made easy to cope with the various sizes of the proper-scan image. Especially, it is easy to cope with the various sizes even if it is required to make the speed high.

Then finally, in the combining portion 280, the proper-scan image is combined with the blurring mask (S7 in FIG. 13) to obtain the soft-focus-processed output image ((6) in FIG. 14). In this case, the blurring mask of the corresponding color is combined with the data for each of the colors of the proper-scan image. In addition, this word 'combining' means doing adding operation with the respective data of the corresponding pixels of the blurring mask and the original image.

That is, color images for the respective colors are blurred, enlarged, and combined with the original image; hence, soft focus processing can be made without deteriorating the color tone.

This addition combining is shown by the following equation:

soft focus image=S×(blurring mask image)+(1−S)×(proper-scan image), where, 0<S<1.

Accordingly, the larger the soft focus coefficient S is made, the stronger soft focus effect can be obtained.

By practicing the above process, the soft focus processing can be performed; further, it is favorable to carry out the following process, at the time of combining in the combining portion 280:

(1) converting the density values of the blurring mask image into the brightness values, (2) converting the density values of the proper-scan image into the brightness values, (3) combining the brightness values having been converted in the above steps (1) and (2) by addition, and (4) converting the addition-combined brightness values into the density values;

because it can be reproduced such an image tone of soft focus as has been soft-filtered at the time of photographing.

Further, it is favorable to carry out the processing such as (1) converting the density values of the blurring mask image into the transmittance values of the negative, (2) converting the density values of the proper-scan image into the transmittance values of the negative, (3) combining the transmittance values having been converted in the above steps (1) and (2) by addition, and (4) converting the addition-combined transmittance values of the negative into the density values, because it can be obtained an effect such that a soft filter is used at the time of printing from the negative film.

In addition, in this example of the embodiment, the explanation has been made regarding the color image having three color components for the respective colors; however, the similar processing can be applied to a monochromatic image. That is, the soft focus processing can also be actualized by the combining process with a monochromatic image and the corresponding blurring mask.

<The Fourth Example of the Embodiment>

The above-described soft focus processing in the third example of the embodiment requires a large amount of memory capacity and calculation processing in order to secure the high precision of the calculation; however, by using the following LUT for soft focus processing, an approximate processing can be carried out simply.

Figure 15:
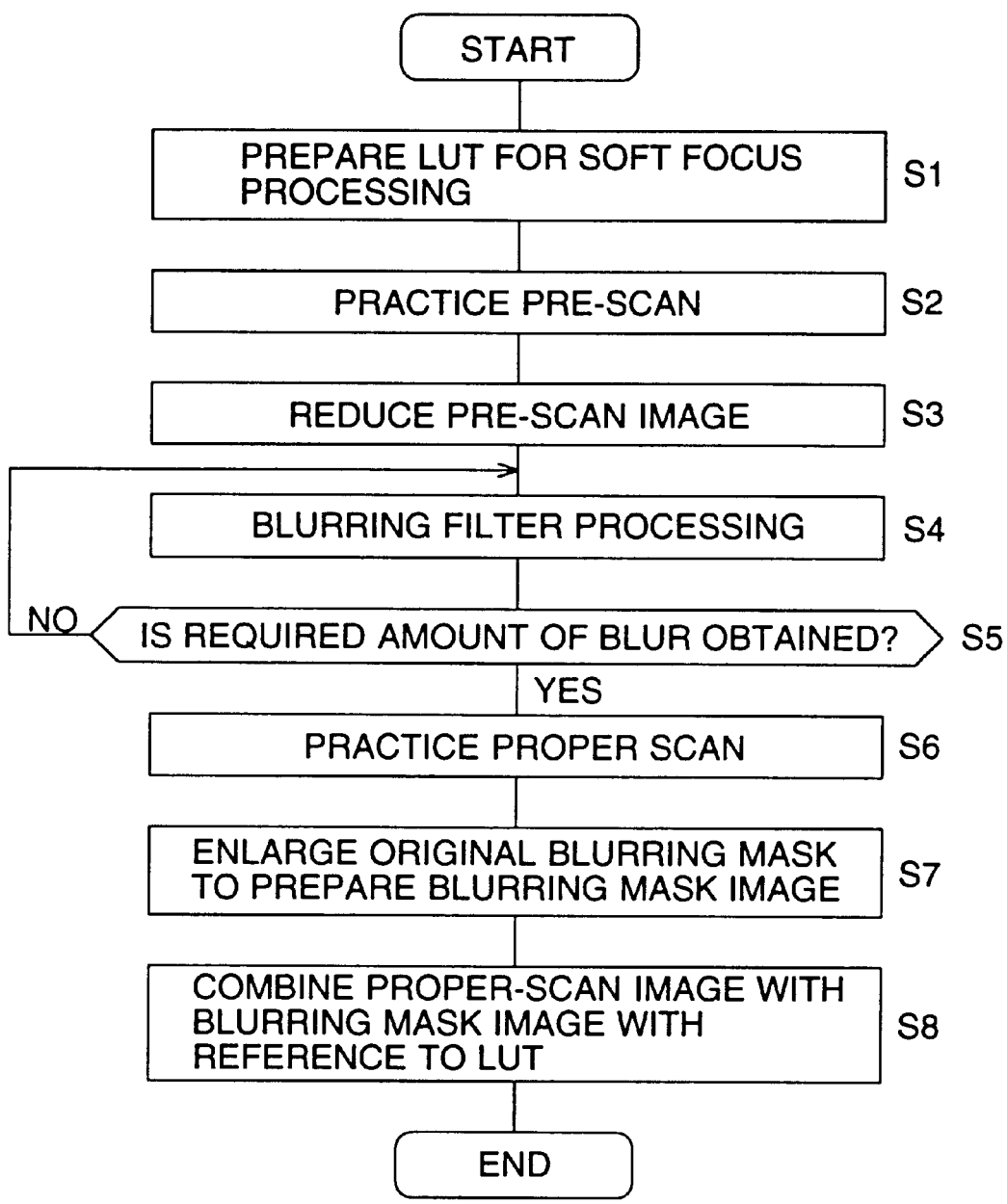
FIG. 15 is a flow chart showing the steps of the procedure of the processing of the image processing apparatus used in the fourth embodiment of this invention.

FIG. 15 is a flow chart showing the outline of the soft focus processing in the fourth example of the embodiment.

First, with respect to all values of density×(−256−+256), the soft focus LUT is prepared by the following calculation (S1 in FIG. 15), where the unit of x is defined to be the density value multiplied by 100:

$$dx = 1.0 + 10^{(\alpha/100)},$$

and $$LUT[x] = \{\log_{10}(dx)\} \times 100 - \beta,$$

where $\alpha = (x+\gamma)/100,$ $\beta$: a fixed value for level adjustment $\gamma$: a soft-focus strength adjusting value.

Then, the negative film or the like having an original image recorded on it is set on the scanner 100, and the pre-scan is carried out (S2 in FIG. 15).

In stead of the above calculation, the following calculation may be used. However, the above calculation may be preferable, because it may be easy to control the intensity of the soft focus.

$$dx = 1.0 + 10^{(x/100)};$$

and $$LUT[x] = \{\log_{10}(dx)\} \times 100 - 30$$

Further, the data obtained by this pre-scan are converted into the data of density values by the density value LUT 201. Next, these data are reduction-processed in the reduction processing portion 210 to produce the reduced pre-scan image (S3 in FIG. 15). Incidentally, this reduced pre-scan image is used as the original blurring mask image.

Regarding the size of this reduced pre-scan image, it is the same as that already described in the third example of the embodiment.

Next, the blurring filter processing portion 260 executes the blurring filter processing of the order 3×3–5×5 to the original blurring mask (S4 in FIG. 15).

After the original blurring mask is prepared in the above-mentioned manner, or while the original blurring mask is being prepared, the proper scan is practiced to obtain the proper-scan image (S6 in FIG. 15).

Then, the enlargement processing portion 270 executes the enlargement processing to the original blurring mask which is given a suitable amount of blur to prepare the blurring mask enlarged to the same size as the proper-scan image obtained by the proper scan (S6 in FIG. 15, (5) in FIG. 14).

Then finally, in the combining portion 280, the proper-scan image is combined with the blurring mask (S7 in FIG. 15) to obtain the soft-focus-processed output image.

In this case, the value of the image after combining Ti can be expressed as follows:

$$Ti = S \times (LUT[Qi-Pi]) + Pi,$$

where Pi is the value of the proper-scan image, Qi is the value of the blurring mask image, and S is the strength of the soft focus.

Further, if the first term of the right-hand side of the above equation is arranged to make an LUT, Ti is expressed as follows:

$$Ti = LUT'[Qi-Pi] + Pi.$$

Accordingly, the effect of soft focus at the time of photographing can be actualized by only the adding and subtracting operation between the respective image data and by referring to the soft focus processing LUT (the above-mentioned LUT'). Owing to this, it becomes possible to make the amount of calculation reduced and the processing time shortened.

Further, if the above-described soft focus processing LUT is prepared beforehand by using the following equations to obtain the values, the soft focus processing at the time of printing can be practiced by the same technique as that used for the one at the time of photographing.

$$dx = 1.0 + 10^{-\alpha/100},$$

and $$LUT[x] = \{\log_{10}(dx)\} \times 100 - \beta,$$

where $\alpha = (x+\gamma)/100,$ $\beta$: a fixed value for level adjustment $\gamma$: a soft-focus strength adjusting value.

Furthermore, if the above-described two kinds of soft focus processing LUT's are both prepared and the function for selecting one of them at need is provided, prints suitable for each of the scenes and meeting each of the requirements of the customers can be simply produced.

In stead of the above calculation, the following calculation may be used.

$$dx=1.0+10^{(-x/100)},$$

and $$LUT[x]=\{\log_{10}(dx)\}\times 100-30$$

In addition to this, according to the method of this example of the embodiment, the soft focus processing is a simple one only adding the LUT'[Qi−Pi] to the proper-scan image Pi; hence, the processing for the scenes which requires no soft focus processing may be practiced merely by deleting the addition instruction only or skipping it, and the method has also the advantage that the selection to use the function or not can be made without giving any influence to the other necessary image processing algorithms.

In the above four embodiments mentioned above, after the proper-scan image is synthesized or combined with the blurring mask, it may be preferable to change the contrast of the entire image in accordance with the strength of the effect of the dodging (soft-focus).

The processing in the image processing section 200 or 200' in the above four examples may be conducted by a hardware or a software. In the case that the processing is conducted by a software, a program is read out from a medium in which the programs capable of conducting steps indicated in the flowchart of each example are memorized and then the image processing section 200 or 200' conducts the processing in accordance with the program.

(1) According to this invention, the sets of emergence frequencies of the data concerning the brightness are divided into a plurality of blocks, the dodging mask is prepared on the basis of at least one of the plural blocks, and the addition calculation is carried out with this dodging mask and the corresponding pixels of the original image; hence, the dodging image processing to get rid of the saturation in the light and dark area can be actualized, with the contrast and gradation reproduction of each photographic objects kept good.

(2) According to this invention, the color images for the respective color components are blurred, enlarged, and added to the original image; hence, a desired soft focus image suiting to the customer's taste can be reproduced without deteriorating the color tone at the time of soft focus processing.

What is claimed is:

1. A method of processing an image, comprising steps of:
   obtaining data concerning the brightness of an original image;
   dividing the data concerning the brightness into a plurality of groups for each brightness domain on the basis of the histogram of the data concerning the brightness;
   preparing correction information for correcting the data concerning the brightness for each of the plurality of groups, and
   executing image processing to the original image on the basis of the correction information.

2. The method of claim 1, wherein the preparing step comprises:
   producing a mask to correct the data concerning the brightness for each of the plurality of groups; and
   blurring the mask by using a blurring filter so as to prepare the correction information.

3. The method of claim 2, wherein the executing step executes the image processing by adding the original image with the correction information for each pixel.

4. The method of claim 1, wherein the preparing step prepares the correction information such that each brightness having the highest frequency in each group comes relatively close to each other.

5. The method of claim 2, wherein the producing step produces the mask such that each brightness having the highest frequency in each group comes relatively close to each other and the data in the mask are equal for plural pixels belonging the same group among the plurality of groups.

6. An apparatus for processing an image, comprising:
   data obtaining means for obtaining data concerning the brightness of an original image;
   dividing means for dividing the data concerning the brightness into a plurality of groups for each brightness domain on the basis of the histogram of the data concerning the brightness;
   preparing means for preparing correction information for correcting the data concerning the brightness for each of the plurality of groups, and
   executing means for executing image processing to the original image on the basis of the correction information.

7. The apparatus of claim 6, wherein the preparing means comprises:
   producing means for producing a mask to correct the data concerning the brightness for each of the plurality of groups; and
   blurring means for blurring the mask by using a blurring filter so as to prepare the correction information.

8. The apparatus of claim 7, wherein the executing means executes the image processing by adding the original image with the correction information for each pixel.

9. The apparatus of claim 6, wherein the preparing means prepares the correction information such that each brightness having the highest frequency in each group comes relatively close to each other.

10. The apparatus of claim 7, wherein the producing means produces the mask such that each brightness having the highest frequency in each group comes relatively close to each other and the data in the mask are equal for plural pixels belonging the same group among the plurality of groups.

11. A media in which a program to execute an image processing is stored and from which the program is read by a computer to execute the image processing comprising steps of:
   obtaining data concerning the brightness of an original image;
   dividing the data concerning the brightness into a plurality of groups for each brightness domain on the basis of the histogram of the data concerning the brightness;
   preparing correction information for correcting the data concerning the brightness for each of the plurality of groups, and
   executing image processing to the original image on the basis of the correction information.

12. The media of claim 11, wherein the preparing step comprises:
   producing a mask to correct the data concerning the brightness for each of the plurality of groups; and
   blurring the mask by using a blurring filter so as to prepare the correction information.

13. The media of claim 12, wherein the executing step executes the image processing by adding the original image with the correction information for each pixel.

14. The media of claim 11, wherein the preparing step prepares the correction information such that each brightness having the highest frequency in each group comes relatively close to each other.

15. The media of claim 12, wherein the producing step produces the mask such that each brightness having the highest frequency in each group comes relatively close to each other and the data in the mask are equal for plural pixels belonging the same group among the plurality of groups.

* * * * *